United States Patent [19]
Zuilichem et al.

[11] 4,322,444
[45] Mar. 30, 1982

[54] METHOD FOR DE-HULLING CACAO BEANS

[76] Inventors: Dirk J. V. Zuilichem, University of Wageningen, Wageningen; Jan Veenendaal, P.O. Box 35, Lochem, both of Netherlands; David Newton, c/o Micronizing Co. (UK) Ltd., Framlingham, near Woodbridge, Suffolk IP13 9PT, England

[21] Appl. No.: 119,208

[22] Filed: Feb. 7, 1980

Related U.S. Application Data

[63] Continuation of Ser. No. 951,728, Oct. 16, 1978, abandoned.

[30] Foreign Application Priority Data

Oct. 21, 1977 [GB] United Kingdom ............... 43956/77

[51] Int. Cl.$^3$ ............................................. A21D 6/00
[52] U.S. Cl. .................................. 426/241; 426/242; 426/482
[58] Field of Search ............... 426/241, 242, 287, 482, 426/631, 593, 469, 240; 219/339, 354, 411, 10.55 M

[56] References Cited

U.S. PATENT DOCUMENTS 2,771,927 11/1956 Thaning ............................ 426/241
3,141,777 7/1964 Guidarelli et al. ................. 426/242

Primary Examiner—Raymond N. Jones
Assistant Examiner—George C. Yeung
Attorney, Agent, or Firm—Burge & Porter Co.

[57] ABSTRACT

The de-hulling of cacao beans is expedited and nib yield increased by treatment with infra-red radiation for a period between one half and two minutes. The radiation preferably has a wavelength between 2 and 6 microns and the treatment may conveniently be carried out by means of apparatus according to British Pat. No. 1,379,116.

16 Claims, No Drawings

METHOD FOR DE-HULLING CACAO BEANS

CROSS REFERENCE TO RELATED APPLICATION

This is a continuation of application Ser. No. 951,728 filed Oct. 16, 1978, now abandoned.

CROSS-REFERENCE TO RELATED PATENT

British Pat. No. 1,379,116 discloses a form of apparatus suitable for use in the process of the invention and its disclosure is incorporated herein by reference.

BACKGROUND OF THE INVENTION

The present invention relates generally to the processing of cacao beans, or cocoa beans as they are otherwise called. The first main step in such processing is the removal of the skins or shells, commonly referred to as "de-hulling". This is normally carried out by a process of mechanical abrasion and cracking, which assists in releasing the skins from the beans which are then subsequently separated out by a winnowing process. The mechanical abrasion and cracking stage, may be preceded by pre-roasting of the beans. This is intended to assist the subsequent mechanical treatment, but also makes it more critical in that it involves the risk of producing quantities of small particles and powder which are difficult to separate from the particles of shell. Moreover it imparts an unacceptable smoky taint to the nib or de-hulled bean and causes a loss of fat from the bean to the shell.

Another possible variation in the processing lies in the use of micro-waves for the pre-treatment of the beans. Although appearing promising, this is no quicker than any other form of pre-roasting, e.g. four to ten minutes, and has the disadvantage of roasting the whole bean from the inside out. This leads to considerable fat loss to the shell and difficulty in the subsequent processing of the beans.

With previous methods of processing a typical nib yield has been 81% of the raw bean weight and the highest yield obtainable has been of the order of 83%. Whatever the method of processing, a constant problem arises from the presence of rodent hairs and insect fragments adhering to the raw beans and which tend to find their way through the winnowing machine into the nibs, thus causing considerable difficulties of hygiene. Similar hygiene problems arise from the presence of moulds, yeasts and bacteria.

SUMMARY OF THE INVENTION

The general objects of the present invention are to improve the processing of cacao beans with particular reference to the problems discussed above. More specifically the objects are to shorten the time of processing; to increase the yield and size of nibs; to increase the fat content and overall quality of the nibs; and to overcome any hygiene problems.

According to the invention, de-hulling is carried out by subjecting the beans to infra-red heating for a period of between one half and two minutes and preferably in the range of forty to one hundred seconds, depending on the origin of the beans. The treatment causes the skin on the bean to dry rapidly, and to crack or explode from the nib or bean without the need for abrasion or cracking, thus making the skin much easier to remove when followed by the subsequent conventional winnowing process. The beans are not tainted in any way and there is no detectable loss of fat into the shells or skins.

The infra-red radiation preferably has a wavelength between 2 and 6 microns, corresponding to a frequency in the range of 0.7 to $1.2 \times 10^8$ megacycles per second, which penetrates the beans and excites the molecules, thus causing them to vibrate at their own frequency, resulting in rapid heating. Not only are the skins very much easier to remove, but the process leads to the production of larger nibs and less fines due primarily to the fact that the very short heating period leaves the beans pliable and resilient. The presence of moisture in the shell increases the efficiency of the infra-red heating. The explosive or shock effect on the shells is able to ease them completely away from the nibs in e.g. 70 to 80 seconds, the speed of treatment avoiding fat transmission to the shells.

After the radiation treatment, the beans are preferably cooled, and can then either be passed to an orthodox winnowing machine or can be stored for future processing. In addition to the advantages already mentioned, it is found that the radiation treatment leads to considerable lowering of the mould, yeast and bacteria counts and also destroys beetles, weevils and other parasites and foreign matter, such as rodent hairs, by burning them to ash, a result not achieved by previous methods of processing.

The infra-red radiation may be conveniently provided by ceramic cores heated by gas or electrical elements, and the treatment as a whole may be carried out by means of apparatus operating in the manner described in British Pat. No. 1,379,116 with only comparatively minor modifications to the apparatus specifically described in that specification. This apparatus was designed for a totally different purpose, i.e. the treatment of seeds in order to increase their starch availability and it is most surprising that it should prove suitable for the purposes of the present invention. A particular modification which has been found desirable is for the machine to include five belt vibrators instead of the two described in the earlier specification, thus ensuring that the beans are turned over during their passage beneath the source of infra-red radiation and thereby avoiding charring. A further modification lies in the substitution of a vibratory conveyor, either inclined or horizontal, for the band conveyor described, this facilitating the turning over of the beans and improving the cracking action.

In practice it is found that the layer of beans on the conveyor should be from one to one and a half beans deep. The speed of the conveyor in relation to the length of the path of treatment needs to be adjusted in accordance with the required treatment time, which depends on the type of beans being processed, e.g. to give a transit time in the region of forty to one hundred seconds, as mentioned above. After the radiation treatment the processed beans fall by gravity directly into a variable speed cooler and the rolling mill described in the earlier specification is dispensed with, being replaced by a spark arrestor chamber to extinguish any charred skins that may occur during processing.

Comparative results obtained by the application of a process in accordance with the invention to cacao beans of different origins are set out in the following table.

TABLE

Three types of beans were used: Equador, Cameroun, Bahia.

TABLE-continued

| Measured total bacterial count | 3 days at 30° C. |
| Yeast count and mould count | 5 days at 22° C. on ogga. |

| Untreated Equador. | Percentage Reduction | | | |
|---|---|---|---|---|
| Bacterial count | $1 \times 10^6$ | | | |
| Mould count | $6 \times 10^4$ | | | |

| Treated Equador at 35 seconds transit time | | | At 50 sec transit time | Percentage reduction |
|---|---|---|---|---|
| Bacterial count | $4 \times 10^5$ | 60% | $3 \times 10^5$ | 70% |
| Yeast count | $8 \times 10^4$ | | $7.4 \times 10^1$ | |
| Mould count | $6 \times 10^3$ | 90% | $4 \times 10^3$ | 93% |

| Cameroun untreated | |
|---|---|
| Bacterial count | $1.8 \times 10^7$ |
| Yeast count | $8.5 \times 10^4$ |
| Mould count | $1 \times 10^5$ |

| Cameroun treated at 50 sec transit time | | |
|---|---|---|
| Bacterial count | $8.6 \times 10^6$ | 52% |
| Yeast count | $1.7 \times 10^4$ | 80% |
| Mould count | $3.7 \times 10^3$ | 96% |

| Bahia untreated | |
|---|---|
| Bacterial count | $8 \times 10^4$ |
| Yeast count | $1.7 \times 10^4$ |
| Mould count | $1 \times 10^2$ |

| Bahia treated at 50 sec transit time | | |
|---|---|---|
| Bacterial count $6 \times 10^4$ | 25% | |
| Yeast count less than $10^2$ | 99+% | |
| Mould count less than $10^2$ | 99+% | |

| Nibs untreated | Percentage reduction |
|---|---|
| Bacterial count | $5 \times 10^6$ |
| Yeast count | $8.6 \times 10^3$ |
| Mould count | $5.6 \times 10^5$ |

| Nibs treated at 50 sec | | At 10 sec. | Percentage reduction |
|---|---|---|---|
| Bacterial count $8 \times 10^3$ | 99% | $2 \times 10^5$ | 96% |
| Yeast count less than $10^2$ | 99%+ | less than $10^2$ | 99% |
| Mould count less than $10^2$ | 99%+ | $3 \times 10^2$ | 99% |

Vegetative cells of entero bacteria (cultivating level)

Cameroun and Bahia untreated more than $10^4$/gram treatment at 50 seconds reduces this to less than 10/gram. From Equador this is obtained after 30 seconds. For Nibs this is untreated $10^3/10^2$ per gram and after treatment of 30 seconds less than 10/gram.

Conclusions

Every kind of bean gives good de-hulling.
Bahia de-hulling improves over 3%.
Bahia gives as good as results as West African species.
Total separation of beans and hull possible.
Yeast totally removable.
Mould totally removable.
Entero bacteria totally removable.
Clean factory and no re-contamination during processing of powders, when normally hygienic conditions prevail in the processing plants.
No fat losses.
No reduction is fat quality.
No smoke taint imparted to the nibs.
10% to 15% of the energy requirements saved in grinding the beans.
Increase in the nib yield on average 1% to 2%.

We claim:

1. A method of de-hulling cacao beans comprising the steps of:
    (a) establishing a field of infra-red radiation;
    (b) non-abrasively loosening and entirely separating the hulls of said beans from the nibs without mechanically abrading or cracking the bean hulls by introducing said beans to said field of infra-red radiation for a period of between about one half and about two minutes; and,
    (c) removing said beans and separated hulls from said field of radiation and sorting the nibs of said beans from the separated hulls to recover the de-hulled beans for further handling.

2. A method of de-hulling cacao beans as claimed in claim 1 wherein said beans are conveyed continuously through said field of radiation.

3. A method of de-hulling cacao beans as claimed in claim 2 wherein said beans are within said field of radiation for a period between about 40 and about 100 seconds.

4. A method of de-hulling cacao beans according to claim 1 wherein said infra-red radiation has a wavelength between about 2 and about 6 microns.

5. A method of de-hulling cacao beans as claimed in claim 2 wherein said beans are conveyed through said field of radiation on an openwork metal conveyor.

6. A method of de-hulling cacao beans as claimed in claim 2 wherein said beans are conveyed through said field of radiation on a vibratory conveyor.

7. A method of de-hulling cacao beans according to claim 1 comprising heating ceramic cores whereby to provide said field of infra-red radiation.

8. A method of de-hulling cacao beans comprising the steps of:
    (a) providing an array of ceramic cores;
    (b) heating said cores to provide a field of infra-red radiation having a wavelength between about 2 and about 6 microns;
    (c) non-abrasively loosening and entirely separating the hulls of said beans from the nibs without mechanically abrading or cracking the bean hulls by conveying said beans through said field of radiation during a transit time of between about one half and about two minutes;
    (d) removing said beans and separated hulls from said field of radiation;
    (e) cooling said beans; and,
    (f) sorting the nibs of said beans from the separated hulls to recover the de-hulled beans for further handling.

9. A method of de-hulling cacao beans as claimed in claim 8 wherein said ceramic cores are heated by combustion of a mixture of air and gas.

10. A method of de-hulling cacao beans as claimed in claim 8 wherein the transit time is between about 40 seconds and about 100 seconds.

11. A method of de-hulling cacao beans as claimed in claim 8, wherein said beans are subjected to a winnowing process whereby to separate the nibs from the shells.

12. A method of de-hulling cacao beans comprising the steps of:
    (a) providing a source of infra-red radiation and operating the source to establish a field of infra-red radiation, the source including structure defining a path of movement through the field;
    (b) conveying cacao beans to be de-hulled along the path into the field of the source;
    (c) operating the source to subject the positioned beans to infra-red radiation;

(d) continuing the operation of the source for a total of between about one half and about two minutes to non-abrasively effect loosening and removal of the hulls of these beans without mechanically abrading or cracking the bean hulls;

(e) conveying the de-hulled beans along the path to a position out of the field of the source; and (f) sorting the de-hulled beans from the separated hulls to recover the de-hulled beans for further handling.

13. A method of de-hulling cacao beans as claimed in claim 12 wherein the operation of the source is continued for a period between about 40 and 100 seconds.

14. A method of de-hulling cacao beans as claimed in claim 12 wherein said source infra-red radiation has a wavelength between about 2 and 6 microns.

15. A method of de-hulling cacao beans as claimed in claim 12 wherein said source of infra-red radiation is provided by heating ceramic cores.

16. A method of de-hulling cacao beans as claimed in claim 12 wherein said beans are subjected to a winnowing process whereby to separate the de-hulled beans from said hulls and hull fragments.

* * * * *